(12) United States Patent
Laster et al.

(10) Patent No.: US 10,990,622 B2
(45) Date of Patent: Apr. 27, 2021

(54) LIVEWELL OPERATION AND CONTROL FOR A VESSEL

(71) Applicant: Navico Holding AS, Egersund (NO)

(72) Inventors: Matthew W. Laster, Broken Arrow, OK (US); Aaron J. Burton, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 844 days.

(21) Appl. No.: 15/628,216

(22) Filed: Jun. 20, 2017

(65) Prior Publication Data
US 2018/0365246 A1    Dec. 20, 2018

(51) Int. Cl.
| | |
|---|---|
| G06F 16/44 | (2019.01) |
| A01K 61/95 | (2017.01) |
| A01K 63/04 | (2006.01) |
| A01K 63/02 | (2006.01) |
| A01K 97/00 | (2006.01) |
| A01K 97/20 | (2006.01) |
| A01K 99/00 | (2006.01) |

(52) U.S. Cl.
CPC ............ *G06F 16/444* (2019.01); *A01K 61/95* (2017.01); *A01K 63/02* (2013.01); *A01K 63/047* (2013.01); *A01K 97/00* (2013.01); *A01K 97/20* (2013.01); *A01K 99/00* (2013.01)

(58) Field of Classification Search
CPC ........ A01K 61/95; A01K 61/90; A01K 63/02; A01K 63/047; A01K 97/20; A01K 97/00; A01K 99/00; A01K 97/05
See application file for complete search history.

(56) References Cited

U.S. PATENT DOCUMENTS

| | | | | |
|---|---|---|---|---|
| 3,148,476 A | * | 9/1964 | Ethridge ................ | A01K 63/02 43/55 |
| 4,748,765 A | * | 6/1988 | Martin ................... | A01K 97/20 43/55 |
| 4,945,672 A | * | 8/1990 | Raia ....................... | A01K 97/05 261/121.2 |

(Continued)

OTHER PUBLICATIONS

U.S. Appl. No. 15/150,898, filed May 10, 2016; In re: Butterworth; entitled Systems and Associated Methods for Measuring the Length of a Fish.

*Primary Examiner* — Christopher D Hutchens
*Assistant Examiner* — Kevin M Dennis
(74) *Attorney, Agent, or Firm* — Nelson Mullins Riley & Scarborough LLP

(57) ABSTRACT

Livewells of a vessel are used to store caught fish, such as during fishing competitions. Apparatuses, systems, and methods track and use fishing information for efficient operation and control of livewells and the associated pumps. An example marine electronic device of a vessel comprises a user interface with a display screen, a processor, and memory including computer program code. The memory and the computer program code are configured to, with the processor, cause the marine electronic device to receive an indication of a fish catch and cause, in response to receiving the indication of the fish catch, a pump associated with a livewell of the vessel to one of fill the livewell with water or recirculate water in the livewell, wherein the water is pumped from a body of water in which the vessel is at least partially submerged.

17 Claims, 7 Drawing Sheets

(56) References Cited

U.S. PATENT DOCUMENTS

| | | | | |
|---|---|---|---|---|
| 6,810,617 B1* | 11/2004 | Burroughs | A01K 97/20 | 43/55 |
| 7,162,831 B1* | 1/2007 | Morton | A01K 63/02 | 119/226 |
| 8,813,685 B2* | 8/2014 | Vento | A01K 61/10 | 119/226 |
| 9,972,110 B2* | 5/2018 | Steward | G06T 11/60 | |
| 10,200,823 B2* | 2/2019 | Laster | H04W 4/027 | |
| 10,251,382 B2* | 4/2019 | Bailey | G06F 3/014 | |
| 10,451,732 B2* | 10/2019 | Laster | G01S 7/6218 | |
| 2005/0204610 A1* | 9/2005 | Bogart | A01K 97/20 | 43/55 |
| 2007/0068063 A1* | 3/2007 | Simpson | A01K 63/02 | 43/57 |
| 2008/0028667 A1* | 2/2008 | Grzybowski | A01K 63/02 | 43/57 |
| 2009/0120853 A1* | 5/2009 | Vento | A01K 63/02 | 210/130 |
| 2010/0206240 A1* | 8/2010 | Vento | A01K 63/02 | 119/247 |
| 2012/0085019 A1* | 4/2012 | Link | A01K 97/05 | 43/55 |
| 2013/0263792 A1* | 10/2013 | Vento | A01K 63/02 | 119/226 |
| 2015/0054732 A1* | 2/2015 | Bailey | G06F 3/014 | 345/156 |
| 2015/0057968 A1* | 2/2015 | Bailey | G06F 15/0225 | 702/150 |
| 2015/0058323 A1* | 2/2015 | Bailey | A01K 99/00 | 707/722 |
| 2015/0313196 A1* | 11/2015 | Castaneda | G01G 17/00 | 43/4.5 |
| 2016/0170022 A1* | 6/2016 | Laster | G01S 7/6218 | 367/7 |
| 2017/0171316 A1* | 6/2017 | Laster | H04W 4/027 | |
| 2017/0215401 A1* | 8/2017 | Ellis, II | A01K 63/042 | |
| 2018/0206459 A1* | 7/2018 | Crawford | H04Q 9/00 | |
| 2019/0120959 A1* | 4/2019 | Laster | G01S 7/003 | |

* cited by examiner

LIVEWELL OPERATION AND CONTROL FOR A VESSEL

FIELD OF THE INVENTION

Embodiments of the present invention relate generally to marine vessel control and, more particularly, to systems, assemblies, and associated methods for livewell operation and control for a marine vessel.

BACKGROUND OF THE INVENTION

Fisherman may store fish caught during a fishing trip in a livewell of a fishing vessel. Generally, a livewell comprises a tank that may be filled with water to keep the fish alive while the vessel is on the water. Some livewells are configured to be filled prior to leaving the shore, such as from an external water source, e.g. hose, bucket, or the like, while other livewells may fill from the body of water which the vessel is in, such as by using a fill pump. Fishermen may manually activate the pump to fill the livewell or cause recirculation of the water within the livewell.

BRIEF SUMMARY OF THE INVENTION

In some instances, fisherman may fill the livewell prior to setting out on a fishing expedition, however this practice may add significant weight to the vessel, which may reduce the vessel's transit speed when traveling to fishing locations and/or decrease motor operation efficiency (e.g., increase fuel consumption). Alternatively, fisherman may fill the livewell manually when a fish is caught. However, filling the livewell may require a significant time commitment, during which the fisherman may not be able to continue active fishing. The reduction in speed, increase in fuel consumption, and/or time not actively fishing may be inconvenient or undesirable, such as during regular fishing expeditions, and perhaps more particularly during a fishing competition.

In an example embodiment, a marine electronic device is configured to receive an indication of a fish catch and cause a livewell to fill or recirculate automatically, without operator action. The automatic filling and/or recirculation of the livewell may reduce the weight on the vessel until the livewell is needed and may reduce the time spent by a fisherman filling or recirculating the livewell instead of actively fishing.

In some embodiments, the marine electronic device may also be configured to maintain a livewell temperature and/or oxygen level. The livewell may include one or more sensors to monitor parameters associated with the water in the livewell and recirculate or refresh, e.g. from the water surrounding the vessel, the water in the livewell to maintain, the temperature, oxygen level, or other livewell parameter.

In some example embodiments, the marine electronic device may be configured to receive fish data associated with each fish catch, such as length, weight, and/or species, or the like. The marine electronic device may assign a culling tag, e.g. a number or color coded tag, to each fish. In some instances, such as a fishing tournament where the number of fish allowed on a vessel may be limited, the marine electronic device may determine which fish may be preferred to keep or release based on the fish data and using the culling tag identifiers, thereby enabling quick identification of the fish to be released from among multiple fish in the livewell.

In some example embodiments, the marine electronic device may utilize a current location of the vessel associated with the fish catch to plot a marker on a nautical chart. The plot may be utilized by a vessel autopilot to maintain the vessel in a position, e.g. a trolling motor in anchor mode. In some embodiments, the plot may also include some of the fish data associated with the fish catch, such as may be useful for reviewing the fishing trip or for fishing analytics for future fishing trips.

In some example embodiments, the memory and the computer program code of the marine electronic device are configured to, with the processor, cause the marine electronic device to cause the pump to fill the livewell by causing the pump to start conveying water into the livewell, determining a fill parameter of the livewell, and causing the pump to stop conveying water in response to the fill parameter satisfying a predetermined fill parameter metric.

In an example embodiment, the memory and the computer program code are further configured to, with the processor, cause the marine electronic device to receive an indication of an oxygen level of water in the livewell from one or more oxygen sensors and cause the pump to recirculate water in the livewell in response to determining that the oxygen level is below a predetermined oxygen threshold.

In some example embodiments, the memory and the computer program code are further configured to, with the processor, cause the marine electronic device to receive an indication of temperature of the water in the livewell from one or more temperature sensors and, in response to determining that the temperature is outside a predetermined temperature range, cause a portion of the water in the livewell to be drained through a purge valve into the body of water and cause the pump to convey additional water into the livewell.

In an example embodiment, the memory and the computer program code are configured to, with the processor, cause the marine electronic device to receive an indication of fish data for a fish associated with the fish catch and assign, in the memory, a culling tag to the fish based on the fish data. In some example embodiments, the fish is a first fish and the fish catch is a first fish catch. The memory and the computer program code are further configured to, with the processor, cause the marine electronic device to receive an indication of a second fish catch, receive second fish data for a second fish associated with the second fish catch, compare the first fish and the second fish based on one or more predetermined fish metrics, determine a preferred fish from the first fish and the second fish based on the one or more fish metrics, and cause an indication of the preferred fish to be displayed on the user interface. In an example embodiment, the memory and the computer program code are further configured to, with the processor, cause the marine electronic device to cause an indication of the preferred fish by causing display of an indication to replace the second fish with the first fish in an instance in which the second fish is the preferred fish from among the first fish and the second fish. In some example embodiments, the memory and the computer program code are further configured to, with the processor, cause the marine electronic device to cause an indication of the preferred fish by causing display of an indication of the culling tag associated with the first fish.

BRIEF DESCRIPTION OF THE DRAWINGS

Figure 1:
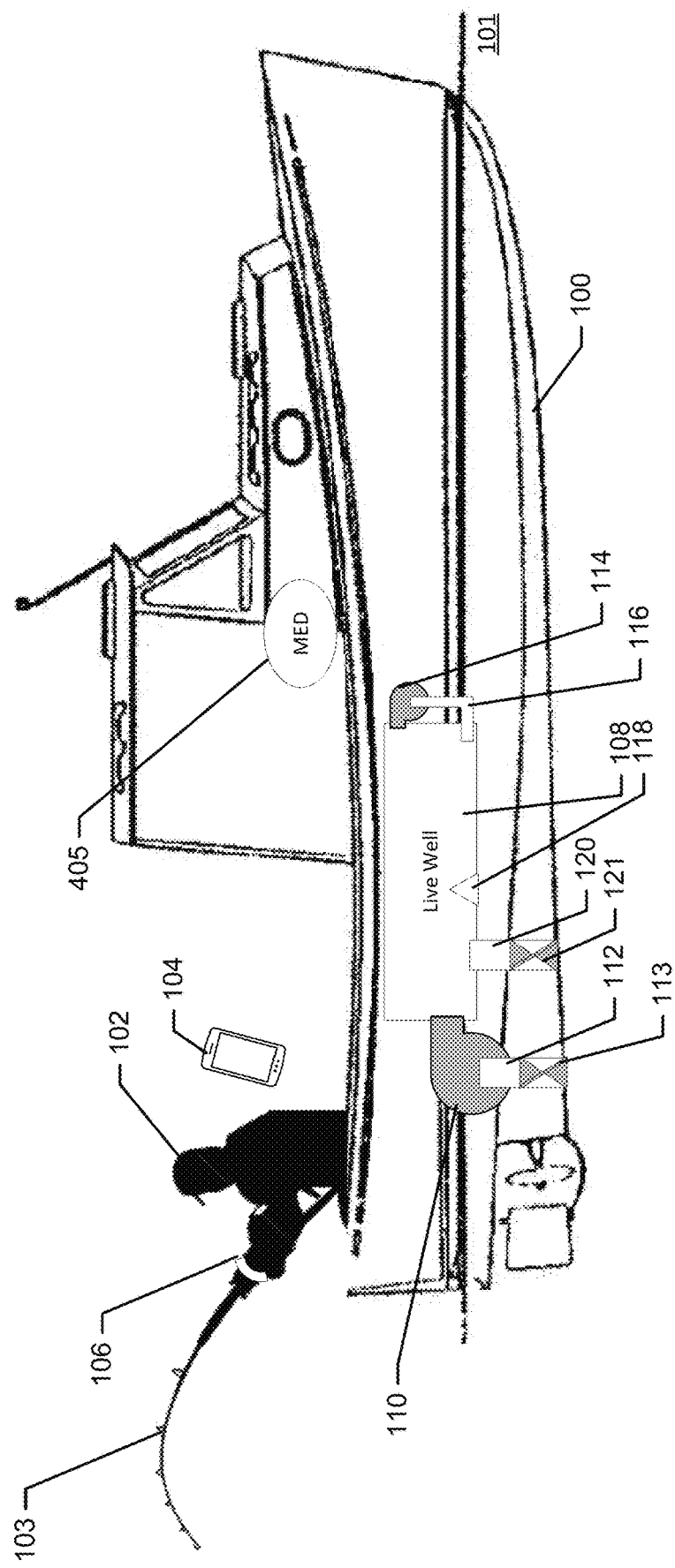
Figure 2:
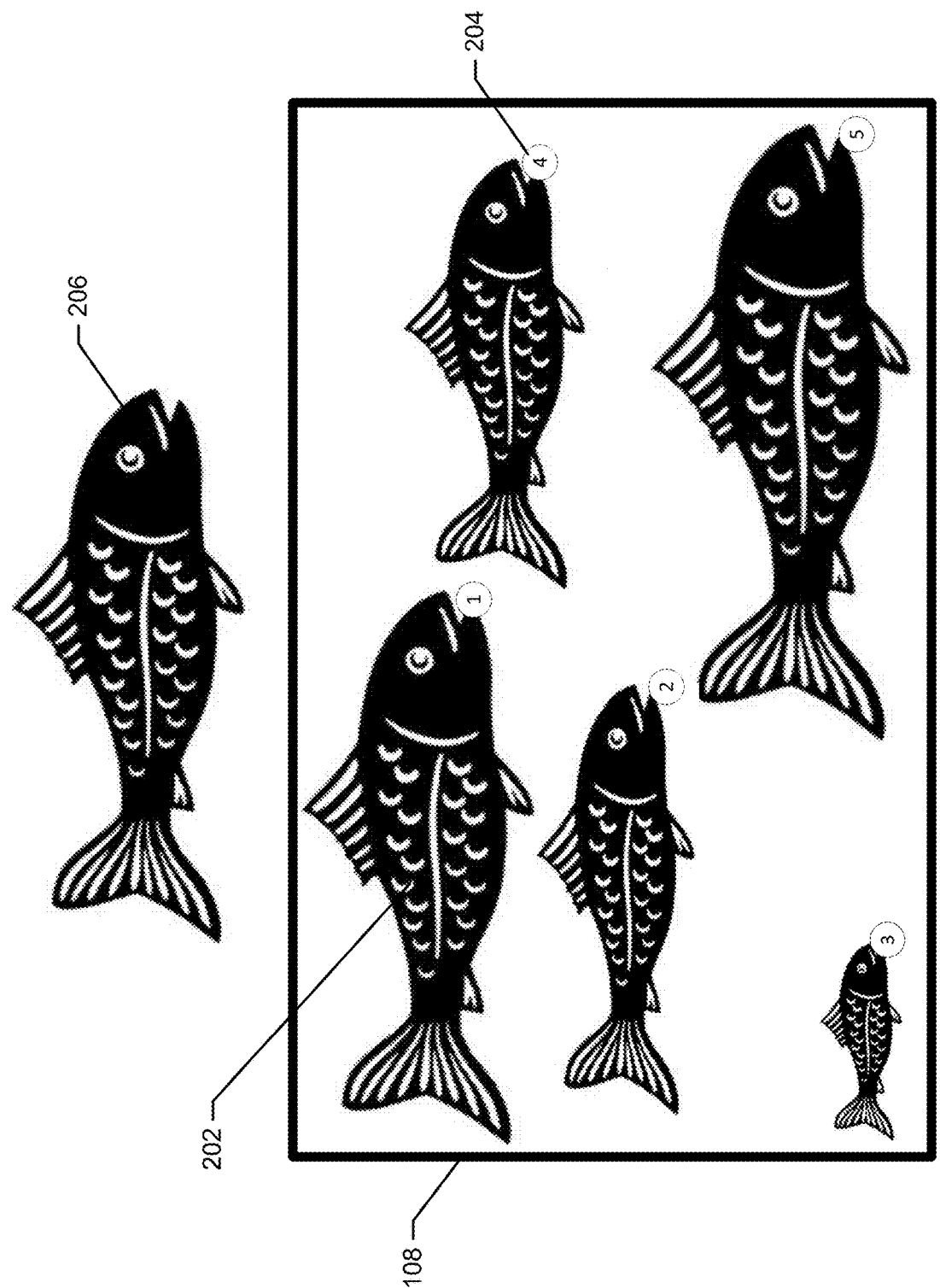
Figure 3:
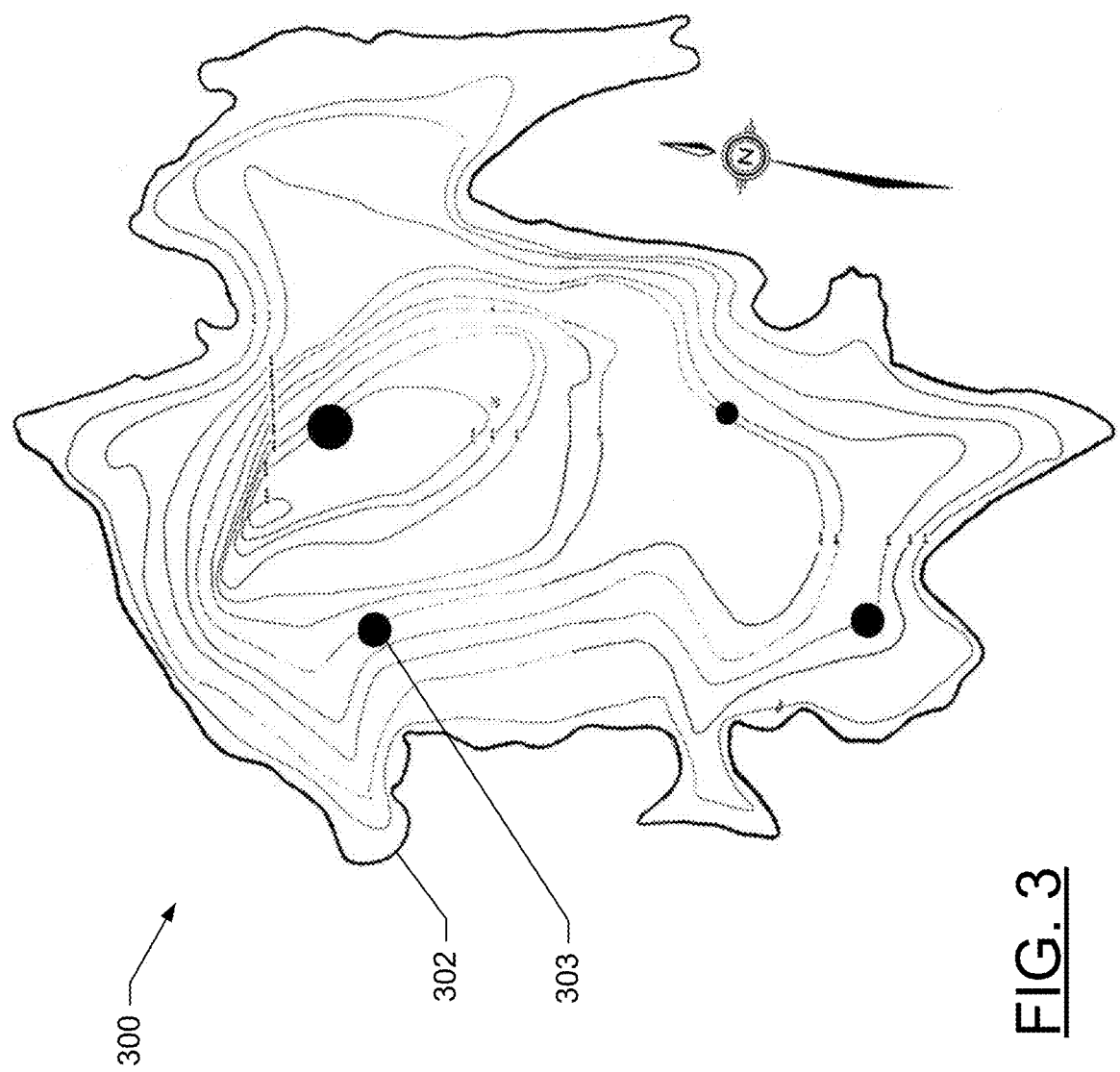
Figure 4:
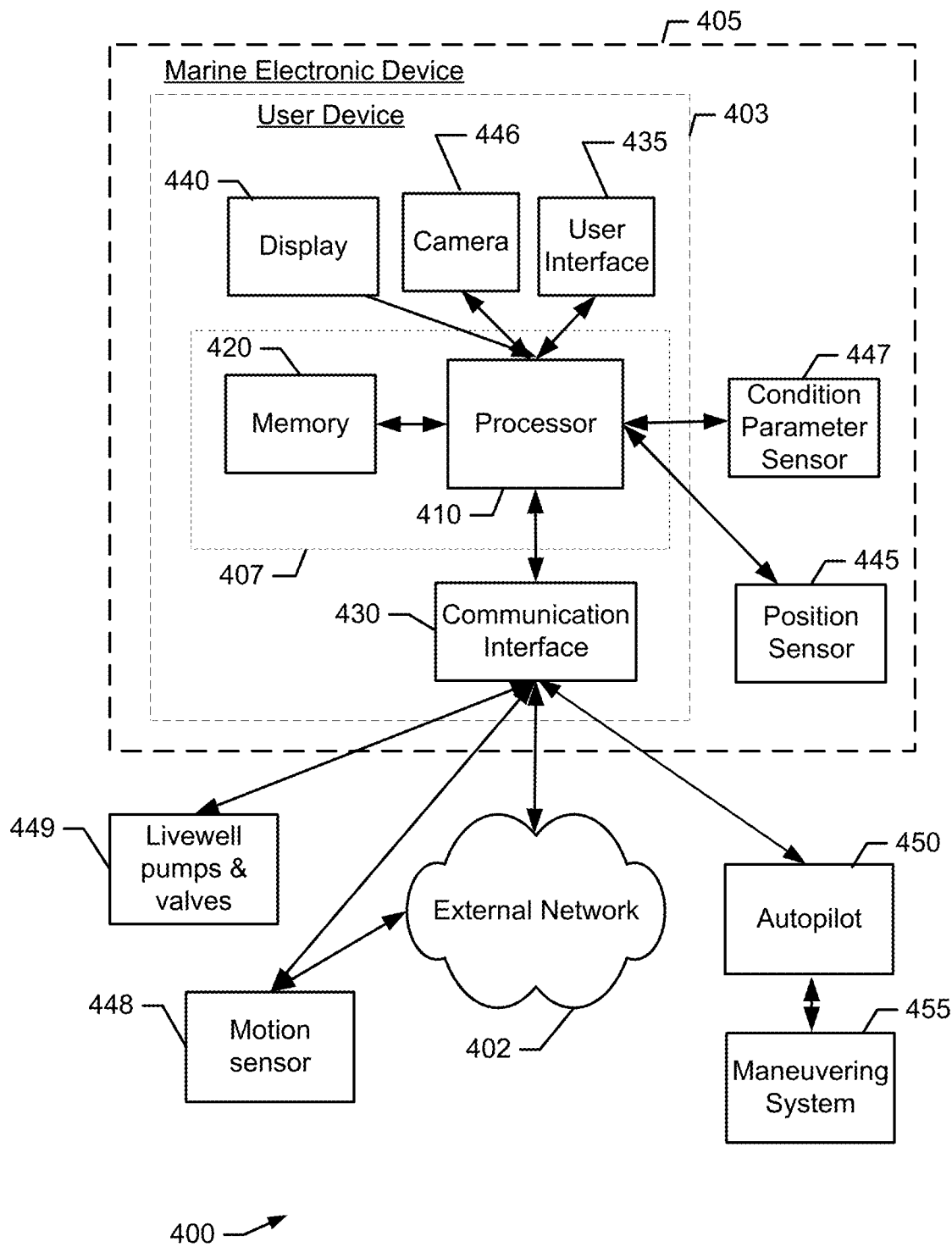
Figure 5:
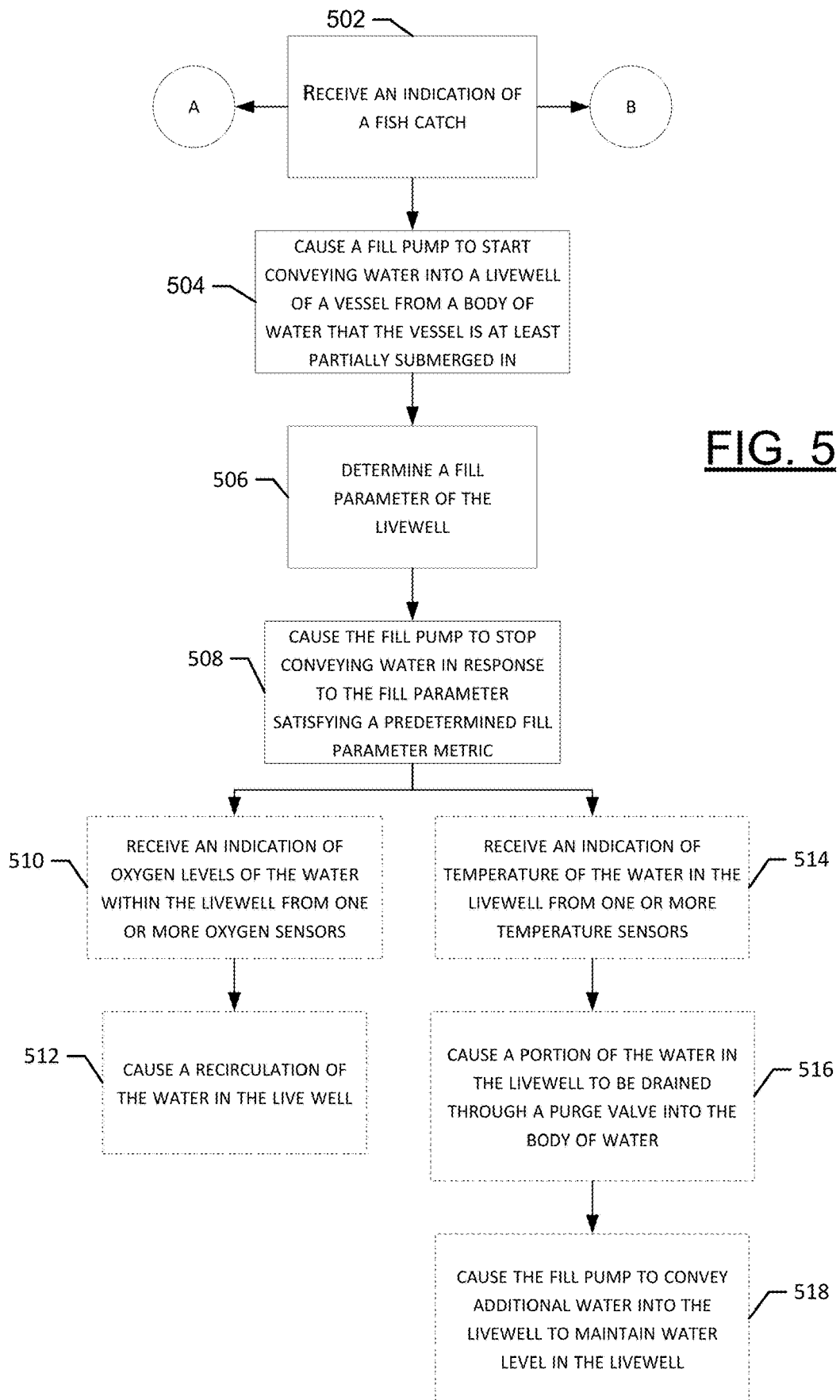
Figure 6:
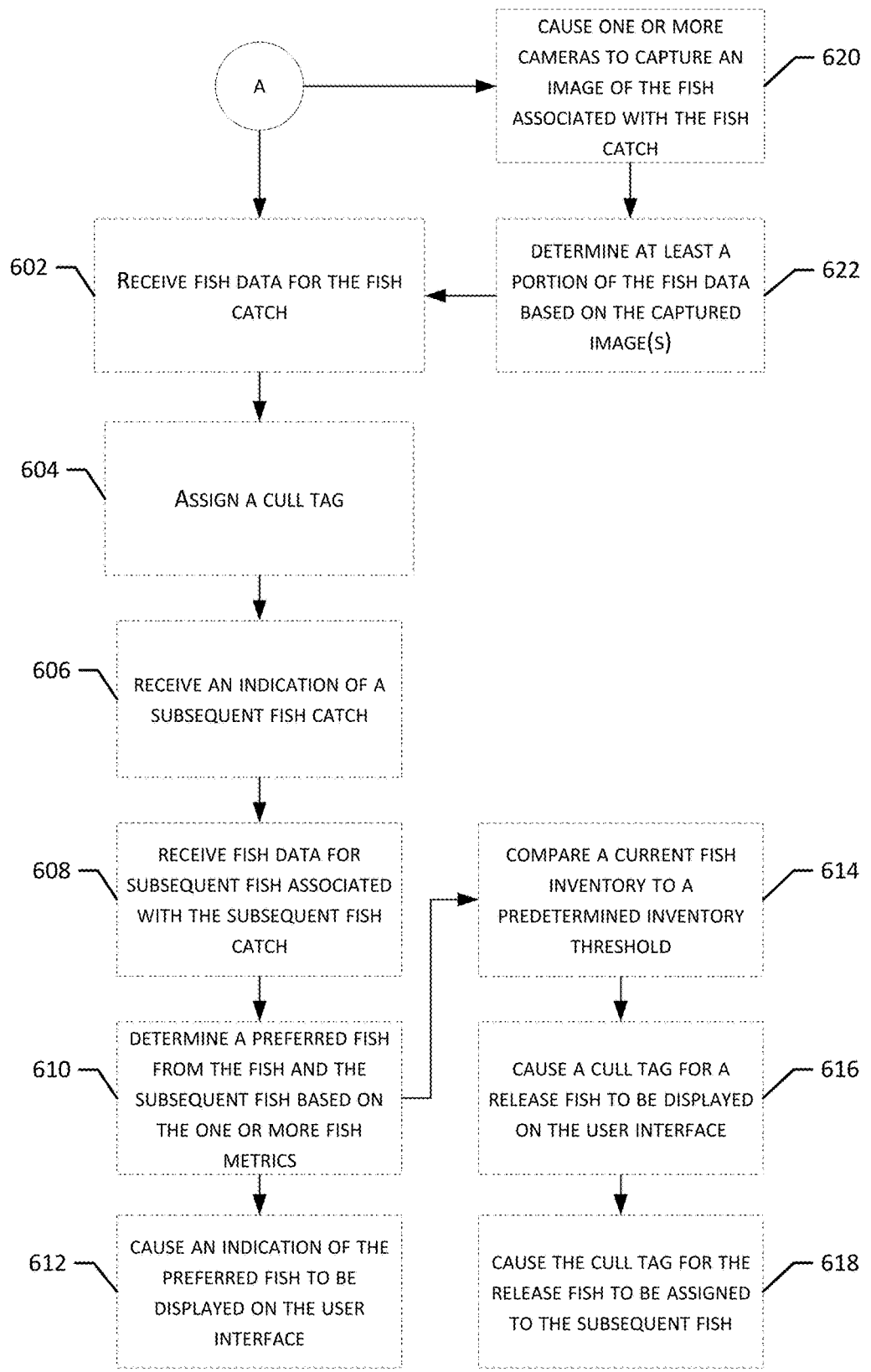
Figure 7:
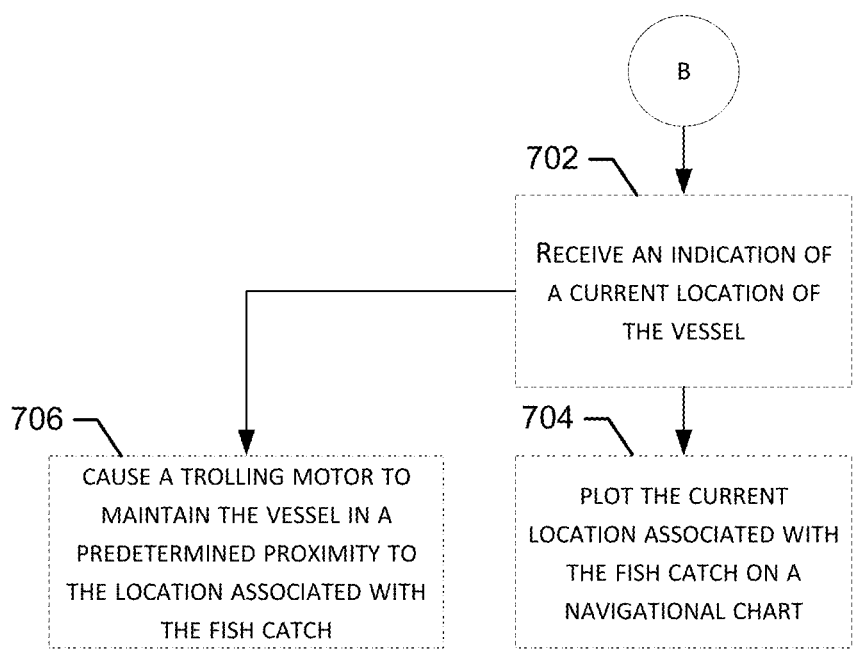

Having thus described the invention in general terms, reference will now be made to the accompanying drawings, which are not necessarily drawn to scale, and wherein:

FIG. 1 illustrates an example fishing vessel in accordance with some embodiments discussed herein;

FIG. 2 illustrates a representation of an example livewell with fish including culling tags in accordance with some embodiments discussed herein;

FIG. 3 shows an example nautical chart including a plotted location in accordance with some example embodiments discussed herein;

FIG. 4 illustrates a block diagram of an example marine electronic device and system in accordance with some example embodiments discussed herein; and FIGS. 5-7 illustrate flowcharts of example methods of operating and/or controlling components of a vessel according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates an example watercraft, e.g. vessel 100, configured to traverse a marine environment, e.g. body of water 101. The vessel 100 may include a marine electronic device (MED) 405 disposed on and/or proximate to the vessel. The vessel 100 may be a surface watercraft, a submersible watercraft, or any other implementation known to those skilled in the art. The marine electronic device 405, which is described in reference to FIG. 4 below, may be utilized to trigger one or more events on the vessel 100 in response to predetermined criteria, such as a fish catch. Example events which may be triggered and predetermined criteria triggering the events are discussed herein.

In an example embodiment, a vessel 100 may include one or more livewells 108 configured to be filled with water for live storage of fish, such as during a fishing expedition. The livewell 108 may be sized based on the type of vessel 100, e.g. vessel size and intended use, and range, for example, from about 5 gallons to about 40 gallons, or more. The weight of the water in the livewell 108 may have a significant impact on the operation of the vessel 100 including an increase in fuel consumption and/or a decrease in speed through the body of water 101 (e.g., the vessel 100 may ride lower in the water). In an example embodiment in which the livewell 108 holds 28 gallons of water, the weight increase due to water may be approximately 240 lbs.

In some example embodiments, a fisherman 102 may desire to delay filling the livewell 108 until a fish is caught and desired to be stored, thus limiting the increase in weight of the vessel 100. In such a manner, the vessel 100 may travel faster and/or operate more efficiently—such as to reach a desired fishing spot on a body of water faster. In some embodiments, the marine electronic device 405 may be configured to receive an indication of a fish catch and, in response to the indication of the fish catch fill the livewell 100.

In an example embodiment, the indication of a fish catch may be received from motion sensor 106, such as may be associated with a fishing rod 103, a wrist of the fisherman 102, among others. The motion sensor 106 may be embodied in a grip or reel of the fishing rod 103, in a wrist strap, smart watch, or other wearable computing device. The motion sensor 106 may sense various movements associated with the fisherman 102 and/or the fishing rod 103. The motion sensor 106 and/or the marine electronic device 405 may be configured to identify motion indicative of fish catch, for example, a jerk indicative of setting a hook and/or a rotating motion indicative of reeling in a fish. Further information regarding some example motion sensors may be found in U.S. Ser. No. 14/032,319, published as U.S. Publication No. 2015/0057968, which is assigned to the Assignee of this application and incorporated herein by reference in its entirety.

Additionally or alternatively, the indication of a fish catch may be input by the fisherman 102 using a user interface of the marine electronic device 405 and/or a mobile computing device 104, such as a tablet computer, personal data assistant (PDA), smart phone, or the like. The fisherman 102 may select an icon, button, or the like indicating a fish catch.

In some embodiments, in response to the indication of a fish catch, the marine electronic device 405 may cause the livewell 108 to automatically fill, such that it is ready to receive a fish for live storage. The marine electronic device 405 may be configured to monitor and/or control operation of a fill pump 112 and/or a fill valve 113. In an example embodiment, the marine electronic device 405 may control a supply of power to the fill valve 113 and/or the fill pump 112, such as a relay, transistor, or the like, in a power supply line connected to the fill pump 112 and/or fill valve 113. In response to the fish catch, the marine electronic device 405 may cause the fill pump 112 to start to fill the livewell 108. In an embodiment in which the vessel includes a fill valve 113, the marine electronic device 405 may cause the fill valve 113 to open with or prior to starting the fill pump 112 causing water to be conveyed into the livewell 108 from the body of water 101 that the vessel 100 is on.

In some embodiments, the marine electronic device 405 may determine a fill parameter associated with the livewell 108, such as fill time, fill level, or the like. The marine electronic device 405 may cause the fill pump 112 to run for a predetermined amount of time, such as 60 seconds, 90 seconds, or the like, based on the size of the livewell 108 and/or a flow rate of the fill pump 112. Additionally or alternatively, the livewell 108 may include one or more sensors 118, such as a level sensor. The level sensor may detect the water level in the livewell 108 and may indicate when the water level has reached a predetermined level (e.g., such as associated with being full). The marine electronic device 405 may cause the fill pump 112 to stop and/or the fill valve 113 to close in response to satisfying the predetermined time and/or predetermined level.

In an example embodiment in which the livewell 108 has been previously filled, the marine electronic device 405 may cause the water in the livewell 108 to recirculate, such as in response to a fish catch or a subsequent fish catch. The livewell 108 may include a recirculation line associated with the fill pump 112 or, in some cases, may include a dedicated recirculation pump 114. The marine electronic device 405 may cause the fill pump 112 or the recirculation pump 114 to start and recirculate the water in the livewell 108 in response to a fish catch, which may, for example, aerate the water to provide sufficient oxygen content in the water for the caught fish to breath.

In some embodiments, the one or more sensors 118 associated with the livewell 108 may include an oxygen sensor. The marine electronic device 405 may receive an indication of oxygen level of the water in the livewell 108. The marine electronic device 405 may compare the oxygen level to a predetermined oxygen threshold, such as 5 ppm, 6 ppm, 10 ppm, or the like. The marine electronic device 405 may cause recirculation of the water in the livewell 108 in response to the oxygen level satisfying, e.g. being at or below, the predetermined oxygen threshold. In some example embodiments, the oxygen level may be displayed on a user interface of the marine electronic device 405 and/or the mobile computing device 104, such that the fisherman 102 may monitor conditions of the livewell 108.

In some example embodiments, the one or more sensors 118 may include a temperature sensor configured to measure the temperature of the water within the livewell 108. The water in the livewell 108 may increase in temperature due to fish activity, heat from the sun, or the like, which may be detrimental to fish within the livewell 108. The marine electronic device 405 may receive an indication of the temperature of the water within the livewell 108 from the temperature sensor and compare the water temperature to a predetermined temperature range. The temperature range may be set based on the ambient water temperature of the body of water 101, type of fish caught, or the like. In some embodiments, the temperature range may be at, for example, 3 degrees above the ambient temperature of the water and 1 degree below, or other suitable temperature range. The temperature range may be set manually by the fisherman 102 or dynamically, such as based on a water temperature sensor associated with the vessel 100 configured to measure the ambient temperature of the body of water 101.

In some embodiments, in response to the temperature being outside of the predetermined temperature range, the marine electronic device 405 may at least partially purge and fill the livewell 108 to introduce water from the body of water 101 into the livewell 108 (e.g., such water may be generally cooler than the water stored in the livewell 108). In an example embodiment, the marine electronic device 405 may monitor and/or control a purge valve 121, configured to drain water from the livewell 108 to the body of water 101. The marine electronic device 405 may be configured to open the purge valve 121 to drain water from the livewell 108 and, in some cases, cause the fill pump 112 to start causing water to be conveyed from the body of water 101 into the livewell 108. The purge and fill may cause the temperature of the livewell 108 to be closer to the ambient temperature of the body of water 101.

In some example embodiments, the marine electronic device 405 may receive one or more indications of fish data for a fish associated with the fish catch. The fish data may, in some embodiments, be manually entered by a fisherman 102 using a user interface of the marine electronic device 405 and/or the mobile computing device 104. The fish data may include the length of the fish, weight of the fish, color of the fish, species of the fish, bait used to catch the fish, or other data associated with the fish. In some embodiments, the fish data may be typed into one or more data fields using the user interface, selected by drop down or scrolling menus, or other suitable data entry method.

Additionally or alternatively, one or more sensors associated with the vessel 100 may be used, such as a measurement sensor configured to measure the weight, such as a scale, or measure the length, such as an optical or tape based measuring device, of the fish. The one or more sensors may transmit the fish data to the marine electronic device 405 to be correlated with a fish catch. In some embodiments, the marine electronic device 405 and/or a fisherman 102 may cause on or more cameras to capture an image of the fish. The images of the fish may include a measurement device, such as a ruler, tape measure, calibrated length, or the like. The marine electronic device 405 may compare the fish to the measurement device and generate a length of the fish to be included in the fish data. In some example embodiments, the marine electronic device 405 may compare the fish to one or more stored fish color or shape profiles and select or recommend a fish type or species to be included in the fish data. In some embodiments, fish length measurement may be performed automatically, such as described further in U.S. Ser. No. 15/150,898, which is assigned to the Assignee of this application and incorporated by reference herein in its entirety.

In some embodiments, in response to receiving the fish data, the marine electronic device 405 may assign a culling tag 204 for a fish 202 to be stored in the livewell 108, such as illustrated in FIG. 2. The culling tag 204 may be an identifier attached to the fish, such as being clipped to the lip, gill, or other appropriate location of a fish 202. The culling tag 204 may identify the fish during storage in the livewell 108. The identifier of the culling tag 204 may include, for example, a color, number, letter, symbol, or the like to identify and differentiate each culling tag 204. The marine electronic device 405 may associate the fish data associated with the fish 202 with the assigned culling tag 204 (e.g., in memory). In some embodiments, the identifier of the culling tag 204 may be a hollow ball, Styrofoam, or other buoyant material, configured to float on top of the water in the livewell 108 to assist the fisherman 102 in locating the culling tags 204.

In some embodiments, the marine electronic device 405 may receive an indication of a subsequent fish catch. The indication of subsequent fish catch may, for example, be substantially similar to the indication of a fish catch, as discussed above in reference to FIG. 1. In some embodiments, the marine electronic device 405 may also receive fish data for a subsequent fish 206 associated with the subsequent fish catch, such as in a manner substantially similar to receiving fish data associated with the fish 202 associated with the first fish catch.

In some embodiments, the marine electronic device 405 may compare the fish data for the subsequent fish 206 to the fish data associated with the fish 202 and determine a preferred fish. In some embodiments, such a comparison may be made to any or all of the fish currently stored in the livewell 108. The preferred fish may, for example, be based on the length, weight, fish type, species, or the like. In some examples, the fisherman 102 may set preference settings and/or utilize predetermined preference settings, such as the largest fish. The marine electronic device 405 may cause the preferred fish to be indicated or displayed on a user interface, such as indicating an identifier of a culling tag 204, an image of the fish 202 or subsequent fish 206, fish data, or the like. The indication of the preferred fish may assist the fisherman 102 in quickly identifying the preferred fish, e.g. best fish, to present, such as for competition purposes, or for tracking during the fishing expedition.

In some example embodiments, the marine electronic device 405 may compare the current fish inventory (which may include a recently caught fish that has not yet been placed in the livewell) to a predetermined inventory threshold. The inventory threshold may be based on a size of the livewell 108 and/or fish limit associated with a wildlife authority or fishing competition, for example 3 fish, 5 fish, 10 fish, or the like. In an example embodiment, the fish inventory may be based on the number of fisherman 102, such as 2 fish, 3 fish, 5 fish, or the like per fisherman 102.

In some embodiments in which the number of fish 202, including the subsequent fish 206, exceeds the inventory threshold, the marine electronic device 405 may be configured to determine a release fish 202 from among the fish in the livewell and, in some cases, the subsequent fish 206. The release fish may be determined based on the type of fish, species, length, weight, or the like. In some embodiments, the release fish may be the least desirable fish of all of the fish 202, including the subsequent fish 206, such as the smallest fish 202, e.g. smallest weight and/or length. In some embodiments, the release fish may be the smallest fish of a type of fish or a species of fish, such as the smallest bottom feeder or catfish.

In an instance in which the release fish is the subsequent fish 206 the marine electronic device 405 may indicate that the current catch is the release fish and fisherman 102 may release that fish (e.g., the subsequent fish 206) back into the body of water 101.

In an instance in which the release fish is one of the fish 202 in the livewell 108, the marine electronic device 405 may cause an indication of the culling tag 204 for a release fish to be displayed on the user interface of the marine electronic device 405 and/or the mobile computing device 104. The fisherman 102 may be able to quickly identify the release fish from the fish 202 in the livewell 108 and release the release fish into the body of water 101.

In some embodiments, the marine electronic device 405 my assign the culling tag 204 removed from the release fish to the subsequent fish 206 to be placed into the livewell 108 for live storage. The automatic determination of the release fish and/or culling tags 204 associated with fish data may allow the fisher man 102 to quickly determine which fish to keep during a fishing expedition and or fishing tournament, without wasting valuable time and reducing the likelihood of releasing the wrong fish.

In some example embodiments, the marine electronic device 405 may be configured to receive an indication of a current location in response to the indication of a fish catch. The current location may be received from a position sensor, such as a global position system (GPS) sensor, or other positioning sensor associated with the marine electronic device 405 and/or the mobile computing device 104. In an example embodiment, the marine electronic device 405 may plot 303 the current location on a navigational chart 300 of the body of water 302, such as depicted in FIG. 3. In some example embodiments, the marine electronic device 405 may associate the fishing data with the plot 303 on the navigational chart 300. In an example embodiments, the marine electronic device 405 may be configured to display the nautical chart 300 including one or more plots 303 on a user interface of the marine electronic device 405 and or the mobile computing device 104. The fisherman 102 may utilize the fish catch locations plots 303 and/or fish data to demonstrate the location of each fish catch, for tournament purposes, such as in which there is a predefined fishing area. Additionally or alternatively, the fisherman 102 may utilize the plots 303 and associated fish data for analytics or planning a future fishing expedition.

In an example embodiment, the marine electronic device 405 may be configured to cause the vessel 100 to move to or maintain a position on the body of water 101 based on the fish catch and current location data. In some example embodiments, the marine electronic device 405 may cause a maneuvering system of the vessel 100, such as a trolling motor, to maintain a predetermined proximity, such as 3 ft., 5 ft., 10 ft., or other suitable proximity, to the current location associated with the fish catch. The trolling motor may act as active anchor activating and turning to maintain the vessel 100 in the predetermined proximity. Additionally or alternatively, the marine electronic device 405 may cause the maneuvering device and/or an autopilot associated with the maneuvering device to follow a predetermined route, such as a shoreline in response to the fish catch and based on the current location.

Example System Architecture

FIG. 4 shows a block diagram of an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with an autopilot 450, livewell pumps and valves 449, a motion sensor 448, or network 402. In an example embodiment, the marine electronic device 405 may comprise a user device 403, such as the mobile computing device 104 discussed above in reference to FIG. 1, or may utilize some components of the user device 403. In an example embodiments, the computing device 403 may include a laptop computer, a tablet computer, a smart phone, personal data assistant (PDA), or the like.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in the marine data system 400.

The marine electronic device 405 may include a processor 410, a memory 420, a user interface 435, a display 440, a camera 446, one or more sensors (e.g. position sensor 445, condition parameter sensor 447, etc.), and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive an indication of a fish catch from a user (e.g. from the user interface 435 and/or the motion sensor 448). Additionally or alternatively, the processor 410 may be configured to cause one or more events in response to the fish catch, such as filling a livewell and/or recirculating the livewell. In some embodiments, the processor 410 may be further configured to receive fish data associated with the fish catch and cause association of the fish data with one or more culling tags, such as described herein.

The memory 420 may be configured to store instructions, computer program code, marine data, such as sonar data, fish data, chart data, location/position data, and other data associated with the navigation system in a non-transitory computer readable medium for use, such as by the processor.

The communication interface 430 may be configured to enable connection to external systems (e.g. an external network 402). In this manner, the marine electronic device 405 may retrieve stored data from a remote, external server via the external network 402 in addition to or as an alternative to the onboard memory 420.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, fish data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

The user interface 435 may include, for example, a keyboard, keypad, function keys, mouse, scrolling device, input/output ports, touch screen, or any other mechanism by which a user may interface with the system.

Although the display 440 of FIG. 4 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405. Similarly, the autopilot 450 is depicted remote from the marine electronic device 405, but may be directly connected to the processor 410 within the marine electronic device.

In an example embodiment, the marine electronic device 405 and/or the user device 403 may include one or more cameras 446. The cameras 446 may be configured to capture one or more fixed or moving images. In some example embodiments, the cameras 446 may be configured to captures one or more images of a fish associated with a fish catch. The marine electronic device may be configured to extract fish data based on the captured images including the fish.

The marine electronic device 405 may include one or more condition parameter sensors 447 configured to measure, for example, livewell parameters, e.g. sensors 118 described in reference to FIG. 1. The condition parameter sensors 447 may include, for example, a water temperature sensor, an oxygen sensor, a light sensor, or the like. The livewell parameters may be utilized to monitor and control one or more parameters of the livewell 108.

The motion sensor 448 may be in communication with the marine electronic device 405, but, in some cases, may be housed remotely, such as in a fishing rod, a wrist strap, smart watch or other wearable device, or the like. The motion sensor 448 and/or the marine electronic device may be configured to use the detected motion to determine motion patterns associated with catching a fish, such as based on the placement and read information of the sensor. For example, a motion sensor 448 disposed in a wrist strap may be configured to detect sharp downward motion associated with setting a fishhook. In some embodiments, the motion sensor may also detect a rotational or oscillation motion associated with reeling in a fish.

In an example embodiment, the marine electronic device 405 may be configured to monitor and/or control operation of one or more livewell pumps and/or valves 449. The marine electronic device 405 may control the fill pump 110 and/or the recirculation pump 114. The marine electronic device 405 may control a power switch such as a relay or transistor to selectively supply power to the livewell pumps. Additionally, the marine electronic device 405 may be configured to control and/or monitor the operation of the fill valve 113 and/or the purge valve 121. The marine electronic device 405 may be configured to control power to a solenoid or servomechanism to change the position of the livewell valves.

The autopilot 450 may include processing circuitry, such as a processor and a memory, configured to operate the maneuvering system 455. The autopilot 450 may be configured to operate the maneuvering system automatically, e.g. without user interaction, causing vessel 100 to travel along a route, such as to a specified fishing location or along a shoreline. The autopilot 450 may generate instructions based on a current position, a programmed route, or the like to operate the maneuvering system 455.

The maneuvering system 455 may include one or more propulsion motors, or engines, including but not limited to, outboard motors, inboard motors, trolling motors, main engines, emergency propulsion motors, or the like. Additionally, the maneuvering system 455 may include one or more control surfaces, such as rudders, planes, or the like configured to steer the vehicle.

Example Flowchart(s) and Operations

Embodiments of the present invention provide methods, apparatus and computer program products for operating and/or controlling one or more components of example embodiments, such as a livewell. Various examples of the operations performed in accordance with embodiments of the present invention will now be provided with reference to FIGS. 5-7.

FIGS. 5-7 illustrate flowcharts according to an example method for triggering events on a vessel in response to a fish catch according to an example embodiment. The operations illustrated in and described with respect to FIGS. 5-7 may, for example, be performed by, with the assistance of, and/or under the control of one or more of the processor 410, memory 420, communication interface 430, user interface 435, position sensor 445, condition parameter sensor 447, motion sensor 448, camera 446, livewell pumps 449, display 440, autopilot 450, and/or maneuvering system 455. The method may include receiving an indication of a fish catch at operation 502 and causing a fill pump to start conveying water into a livewell of a vessel from a body of water that the vessel is at least partially submerged in at operation 504. The method may also include determining a fill parameter of the livewell at operation 506 and causing the fill pump to stop conveying water in response to the fill parameter satisfying a predetermined fill parameter metric at operation 508.

In some embodiments, the method may include additional, optional operations, and/or the operations described above may be modified or augmented. Some examples of modifications, optional operations, and augmentations are described below, as indicated by dashed lines, such as, receiving an indication of oxygen levels of the water within the livewell from one or more oxygen sensors at operation 510 and causing a recirculation of the water in the livewell at operation 512.

In some example embodiments, the method may additionally include receiving an indication of temperature of the water in the livewell from one or more temperature sensors at operation 514, causing a portion of the water in the livewell to be drained through a purge valve into the body of water at operation 516, and causing the fill pump to convey additional water into the livewell to maintain water level in the livewell at operation 518.

In an example embodiment, the method may include receiving fish data for the fish catch at operation 602 and assigning a culling tag at operation 604. The method may include receiving an indication of a subsequent fish catch at operation 606, receiving fish data for the subsequent fish at operation 608, determining a preferred fish from the fish in the fish and the subsequent fish based on one or more fish metrics at operation 610, and causing an indication of the preferred fish to be displayed in the user interface at operation 612. In some embodiments, the method may include comparing a current fish inventory to a predetermined inventory threshold at operation 614, causing a cull tag for a release fish to be displayed on the user interface at operation 616, and causing the cull tag for the release fish to be assigned to the subsequent fish at operation 618.

In an example embodiment, the method may include causing one or more cameras to capture an image of the fish associated with the fish catch at operation 620 and determining at least a portion of the fish data based on the captured image(s) at operation 622.

In some example embodiments, the method may additionally include receiving an indication of a current location of the vessel at operation 702, causing the current location associated with the fish catch on a navigational chart at operation 704, and causing a trolling motor to maintain the vessel in a predetermined proximity to the location associated with the fish catch at operation 706.

FIGS. 5-7 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A marine electronic device of a vessel, the marine electronic device comprising:
    a user interface comprising a display screen;
    a processor and memory including computer program code, the memory and the computer program code configured to, with the processor, cause the marine electronic device to:
        receive an indication of a fish catch;
        automatically cause, in response to receiving the indication of the fish catch, a pump associated with a livewell of the vessel to one of fill the livewell with water or recirculate water in the livewell, wherein the water is pumped from a body of water in which the vessel is at least partially submerged;
        receive fish data associated with the fish catch, wherein the fish data comprises at least one of a fish length, a fish weight, or a fish species; and
        cause, in response to receiving the fish data, at least some portion of the fish data to be presented on the display screen.

2. The marine electronic device of claim 1, wherein the memory and the computer program code are further configured to, with the processor, cause the marine electronic device to:
    cause the pump to fill the livewell by:
        causing the pump to start conveying water into the livewell;
        determining a fill parameter of the livewell; and
        causing the pump to stop conveying water in response to the fill parameter satisfying a predetermined fill parameter metric.

3. The marine electronic device of claim 1, wherein the memory and the computer program code are further configured to, with the processor, cause the marine electronic device to:
receive an indication of an oxygen level of water in the livewell from one or more oxygen sensors; and
cause the pump to recirculate water in the livewell in response to determining that the oxygen level is below a predetermined oxygen threshold.

4. The marine electronic device of claim 1, wherein the memory and the computer program code are further configured to, with the processor, cause the marine electronic device to:
receive an indication of temperature of the water in the livewell from one or more temperature sensors; and
in response to determining that the temperature is outside a predetermined temperature range:
cause a portion of the water in the livewell to be drained through a purge valve into the body of water; and
cause the pump to convey additional water into the livewell.

5. The marine electronic device of claim 1, wherein the memory and the computer program code are further configured to, with the processor, cause the marine electronic device to:
receive an indication of the fish data for a fish associated with the fish catch; and
assign, in the memory, a culling tag to the fish based on the fish data.

6. The marine electronic device of claim 5, wherein the fish is a first fish and the fish catch is a first fish catch, wherein the memory and the computer program code are further configured to, with the processor, cause the marine electronic device to:
receive an indication of a second fish catch;
receive second fish data for a second fish associated with the second fish catch;
compare the first fish and the second fish based on one or more predetermined fish metrics;
determine a preferred fish from the first fish and the second fish based on the one or more fish metrics; and
cause an indication of the preferred fish to be displayed on the user interface.

7. The marine electronic device of claim 6, wherein the memory and the computer program code are further configured to, with the processor, cause the marine electronic device to cause the indication of the preferred fish by causing display of an indication to replace the second fish with the first fish in an instance in which the second fish is the preferred fish from among the first fish and the second fish.

8. The marine electronic device of claim 7, wherein the memory and the computer program code are further configured to, with the processor, cause the marine electronic device to cause the indication of the preferred fish by causing display of an indication of the culling tag associated with the first fish.

9. A non-transitory computer-readable medium having stored thereon a plurality of computer-executable instructions which, when executed by a processor, cause the processor to:
receive an indication of a fish catch;
automatically cause, in response to receiving the indication of the fish catch, a pump associated with a livewell of the vessel to one of fill the livewell with water or recirculate water in the livewell, wherein the water is pumped from a body of water in which the vessel is at least partially submerged;
receive fish data associated with the fish catch, wherein the fish data comprises at least one of a fish length, a fish weight, or a fish species; and
cause, in response to receiving the fish data, at least some portion of the fish data to be presented on a display screen.

10. The marine electronic device of claim 1, wherein the memory and the computer program code are further configured to, with the processor, cause the marine electronic device to:
receive motion data from a motion sensor associated with a fishing rod or a wrist of a user; and
determine occurrence of the fish catch based on the motion data.

11. The marine electronic device of claim 1, wherein receiving the indication of the fish catch comprises receiving user input indicating the fish catch.

12. The non-transitory computer-readable medium of claim 9, wherein the computer-executable instructions are further configured to, with the processor, cause the processor to:
cause the pump to fill the livewell by:
causing the pump to start conveying water into the livewell;
determining a fill parameter of the livewell; and
causing the pump to stop conveying water in response to the fill parameter satisfying a predetermined fill parameter metric.

13. The non-transitory computer-readable medium of claim 9, wherein the computer-executable instructions are further configured to, with the processor, cause the processor to:
receive an indication of an oxygen level of water in the livewell from one or more oxygen sensors; and
cause the pump to recirculate water in the livewell in response to determining that the oxygen level is below a predetermined oxygen threshold.

14. The non-transitory computer-readable medium of claim 9, wherein the computer-executable instructions are further configured to, with the processor, cause the processor to:
receive an indication of temperature of the water in the livewell from one or more temperature sensors; and
in response to determining that the temperature is outside a predetermined temperature range:
cause a portion of the water in the livewell to be drained through a purge valve into the body of water; and
cause the pump to convey additional water into the livewell.

15. The non-transitory computer-readable medium of claim 9, wherein the computer-executable instructions are further configured to, with the processor, cause the marine electronic device to:
receive motion data from a motion sensor associated with a fishing rod or a wrist of a user; and
determine occurrence of the fish catch based on the motion data.

16. The non-transitory computer-readable medium of claim 9, wherein receiving the indication of the fish catch comprises receiving user input indicating the fish catch.

17. A marine electronic device of a vessel, the marine electronic device comprising:
a user interface comprising a display screen;

a processor and memory including computer program code, the memory and the computer program code configured to, with the processor, cause the marine electronic device to:
  receive motion data from a motion sensor associated with a fishing rod or a wrist of a user;
  determine occurrence of a fish catch based on the motion data;
  cause, in response to determination of the occurrence of the fish catch, a pump associated with a livewell of the vessel to one of fill the livewell with water or recirculate water in the livewell, wherein the water is pumped from a body of water in which the vessel is at least partially submerged;
  receive fish data associated with the fish catch, wherein the fish data comprises at least one of a fish length, a fish weight, or a fish species; and
  cause, in response to receiving the fish data, at least some portion of the fish data to be presented on the display screen.

* * * * *